US012584836B2

(12) United States Patent
Ramos Neto et al.

(10) Patent No.: US 12,584,836 B2
(45) Date of Patent: Mar. 24, 2026

(54) INSTRUMENTED PENDULUM FOR MINIATURIZED CHARPY IMPACT TEST AND CHARPY IMPACT MACHINE COMPRISING THE INSTRUMENTED PENDULUM

(71) Applicants:PETRÓLEO BRASILEIRO S.A.—PETROBRAS, Rio de Janeiro (BR); UNIVERSIDADE FEDERAL DE UBERLÂNDIA—UFU, Uberlândia (BR)

(72) Inventors: Francisco Francelino Ramos Neto, Rio de Janeiro (BR); Denis Soares De Freitas, Uberlândia (BR); Marcelo Torres Piza Paes, Rio de Janeiro (BR); Rosenda Valdes Arencibia, Uberlândia (BR); Fernando Buiatti Rodrigues, Uberlândia (BR); Ricardo Reppold Marinho, Rio de Janeiro (BR); Sinésio Domingues Franco, Uberlândia (BR)

(73) Assignees: PETRÓLEO BRASILEIRO S.A.—PETROBRAS, Rio de Janeiro (BR); UNIVERSIDADE FEDERAL DE UBERLÂNDIA—UFU, MG (BR)

( * ) Notice: Subject to any disclaimer, the term of this patent is extended or adjusted under 35 U.S.C. 154(b) by 377 days.

(21) Appl. No.: 18/342,622

(22) Filed: Jun. 27, 2023

(65) Prior Publication Data

US 2024/0003795 A1 Jan. 4, 2024

(30) Foreign Application Priority Data

Jun. 29, 2022 (BR) ...................... 10 2022 012957 6

(51) Int. Cl.
*G01N 3/303* (2006.01)

(52) U.S. Cl.
CPC ....... *G01N 3/303* (2013.01); *G01N 2203/001* (2013.01); *G01N 2203/0039* (2013.01); *G01N 2203/0098* (2013.01)

(58) Field of Classification Search
CPC ............. G01N 3/303; G01N 2203/001; G01N 2203/0039; G01N 2203/0098
See application file for complete search history.

(56) References Cited

U.S. PATENT DOCUMENTS 2,139,527 A * 12/1938 Sonntag ................... G01N 3/30
73/845
2,359,044 A * 9/1944 Macbride ................. G01N 3/30
73/12.14

(Continued)

FOREIGN PATENT DOCUMENTS

BR       PI0509158-6       10/2007
DE       10213232 B4       3/2005

*Primary Examiner* — Freddie Kirkland, III
(74) *Attorney, Agent, or Firm* — Knobbe, Martens, Olson & Bear, LLP

(57) ABSTRACT

The present invention relates to the technical field of equipment for impact tests; more specifically, to an instrumented pendulum for Charpy-type impact tests on miniaturized samples. The instrumented pendulum (1) for miniaturized Charpy impact test, according to the present invention, is characterized in that it comprises a main monolithic part, a cleaver (7) housed in an anterior opening of the main monolithic part, and the at least two additional plates (11, 12) removably attached to the respective sides of the main monolithic part of the instrumented pendulum (1). Further, the present invention relates to a Charpy impact machine comprising the instrumented pendulum (1) and an automatic device (6) for releasing the instrumented pendulum (1) at different values of firing angle.

16 Claims, 9 Drawing Sheets

(56)      References Cited

U.S. PATENT DOCUMENTS

| | | | | |
|---|---|---|---|---|
| 2,778,219 | A * | 1/1957 | Wachter .................. | G01N 3/30 |
| | | | | 73/12.14 |
| 3,157,046 | A * | 11/1964 | Orner ...................... | G01N 3/30 |
| | | | | 73/12.14 |
| 3,289,470 | A * | 12/1966 | Hubin ..................... | G01N 3/30 |
| | | | | 73/839 |
| 3,590,631 | A * | 7/1971 | Gonze ..................... | G01N 3/30 |
| | | | | 73/834 |
| 4,615,209 | A * | 10/1986 | Change, Jr. ............. | G01N 3/30 |
| | | | | 73/12.09 |
| 5,770,791 | A | 6/1998 | Manahan | |
| 6,990,845 | B2 * | 1/2006 | Voon ........................ | G01N 3/48 |
| | | | | 73/12.14 |
| 7,222,515 | B2 * | 5/2007 | Hatanaka .............. | G01N 3/303 |
| | | | | 73/12.14 |
| 7,320,242 | B2 * | 1/2008 | Hoo Fatt ................. | G01N 3/30 |
| | | | | 73/12.14 |
| 7,360,393 | B1 * | 4/2008 | Abke ...................... | G01M 7/08 |
| | | | | 73/12.14 |
| 7,726,173 | B2 | 6/2010 | Vergano et al. | |
| 9,377,386 | B2 * | 6/2016 | Ruth ....................... | G01N 3/30 |
| 2004/0103713 | A1 * | 6/2004 | Voon ....................... | G01N 3/48 |
| | | | | 73/12.04 |
| 2009/0100904 | A1 * | 4/2009 | Vergano .................. | G01N 3/30 |
| | | | | 73/12.14 |
| 2019/0184058 | A1 * | 6/2019 | Aihara ................... | A61L 27/06 |

* cited by examiner

FIG. 5a                    FIG. 5b

INSTRUMENTED PENDULUM FOR MINIATURIZED CHARPY IMPACT TEST AND CHARPY IMPACT MACHINE COMPRISING THE INSTRUMENTED PENDULUM

FIELD OF THE INVENTION

The present invention refers to the technical field of equipment for impact tests; more specifically, to an instrumented pendulum for Charpy-type impact tests on miniaturized samples.

BACKGROUND OF THE INVENTION

The mechanical properties of a material are of fundamental importance for engineering designs and serve to guide professionals in the design, commissioning, and suitability for use of equipment when in service. Furthermore, these properties are important in controlling the receipt of materials, or acceptance of a material for a given application.

One of the tests for determining the fracture characteristics of materials is the impact test. Among the impact tests, the one that will be addressed in this application will be the Charpy-type impact test. Charpy-type impact tests are dynamic tests, where the load is applied to the test specimens through the impact between a pendular hammer in free fall and a standardized material sample.

The main advantages of Charpy-type impact tests are the simplicity in carrying out the test, the speed in obtaining results, the low cost, and the ease in preparing the specimen.

The specimens for a conventional Charpy test are standardized by the standards ASTM E23-18 and ISO 148-1: 2016. However, carrying out conventional mechanical tests requires specimens with dimensions that may be unfeasible for certain applications in which the dimensions of the product shape do not allow the extraction of full-size Charpy samples, such as screws, thin-walled tubes, wires, and other small size mechanical components.

Conventional Charpy tests also have the limitation of presenting results only in a comparative way, without providing quantitative values of the force evolution during the fracture of the specimen, which would allow deeper investigations into the behavior of that material, such as absorbed energy or impact force.

In this sense, due to restrictions on the availability of materials, test space, and other considerations, the techniques of testing miniaturized samples are becoming increasingly common as the demands grow to quantify the mechanical properties with the smallest amount of material possible.

In miniaturized sample testing techniques, the alternative is to use specimens with dimensions of 3 mm thick by 4 mm wide, 27 mm long, and 1 mm notch depth (square cross section under the notch), whose tests are standardized by the standards ASTM E2248-13 and ISO 14556:2015. With the miniaturization of the specimens, these techniques require much lower levels of potential energy than samples tested on a conventional scale.

As examples of fields of application of miniaturized sample testing techniques, there can be mentioned: oil pipelines, gas pipelines, piping, oil tanks on offshore platforms, ship hulls, pressure vessels, pipes, subsea equipment, and welded structures in general.

Further, it is worth emphasizing the distinction between Charpy miniaturized samples and subsized samples. In reduced-size specimens of the conventional Charpy test, one of the cross-section dimensions (either width or thickness) preserves the value of conventionally-sized specimens of 10 mm, while the other dimension is reduced to, for example, 2.5 mm, 3 mm, 5 mm, or 7.5 mm. In contrast, miniaturized Charpy specimens have all linear dimensions reduced from those of a full-sized Charpy specimen.

However, instrumented pendulums for performing existing miniaturized Charpy impact tests have limitations as to the amplitude of the range of values of impact energy applicable to a specimen. These restricted impact energy ranges substantially limit the possible types of materials and dimensions to be tested by samples miniaturized by the same pendulum hammer, especially in tests with metallic materials.

Therefore, it is necessary to develop an instrumented pendulum to carry out a miniaturized Charpy impact test that allows adopting a wide range of values of impact energy and testing a plurality of miniaturized specimens of different materials and reduced dimensions.

STATE OF THE ART

In the current state of the art, there are equipment for impact tests of the Charpy-type, some of which are adapted for samples of reduced dimensions and others allowing a limited variation of impact energy.

The patent document U.S. Pat. No. 7,726,173B2 discloses a monolithic pendular hammer with a "C"-shaped head for a machine to perform conventional Charpy impact tests on plastic materials. This hammer, however, is not adapted for carrying out tests on metallic materials, nor on miniaturized samples. Further, there can be highlighted the limitation in the variation of impact energy on the sample, which can only be modified by placing washers on the sides of the pendulum.

The patent document DE10213232B4 refers to a machine for Charpy impact test, whose main proposal is that a force measurement sensor is not arranged in the pendular hammer, but in at least one of the supports of the sample holder, connected to a microcomputer. Therefore, unlike the present application, the pendular hammer is not instrumented itself. Further, the document does not mention or suggest an adaptation for carrying out tests on miniaturized samples. Finally, it is highlighted that, for the variation of the impact energy on the sample, the invention requires the installation of a different pendular hammer.

The patent document PI0509158-6 B1 describes an equipment for Charpy impact tests, with an instrumented pendular hammer, for the determination of the impact energy of metallic and composite materials, and the characterization of their fracture properties for application in the nuclear industry and conventional industry. The equipment has the common limitation of not being adapted for miniaturized samples and of not allowing the impact energy variation on the sample without changing the pendulum.

In turn, the patent document U.S. Pat. No. 5,770,791 describes a method and apparatus for studying the brittle fracture behavior of materials. The equipment has a hammer instrumented by a high-frequency response load cell to measure the force-time curve in miniaturized samples. However, the impact force cannot be varied, since the pendulum has only one configuration.

As can be seen from the description of the above-indicated documents of the State of the Art, there are Charpy-type impact test equipment, with some being adapted for samples of reduced dimensions. However, the proposed devices are often not adapted for carrying out tests on miniaturized samples, and, further, the equipment is too limited in the possible variation of impact energy on the sample to adapt to different miniaturized specimens. The problems found in the documents of the State of the Art result in a restricted range of energy that can be applied during the tests, or in the need for complete replacement of the pendular hammer, this replacement being not only time consuming, but which often also results in the need for laborious recalibration of test equipment.

To enable a wider range of values of impact energy and, consequently, greater flexibility to perform tests on a plurality of miniaturized test specimens, the present invention allows the use of different values of firing angle of the instrumented pendular hammer.

Other features and advantages of the present invention will clearly emerge from the detailed description below, and with reference to the attached drawings, these being provided only as a preferred and non-limiting embodiment.

SUMMARY

The present invention defines, according to a preferred embodiment, an instrumented pendulum for Charpy-type impact tests on miniaturized samples.

The instrumented pendulum 1 for miniaturized Charpy impact test, according to the present invention, is characterized in that it comprises: a main monolithic part, a cleaver 7, housed in an anterior opening of the main monolithic part, and at least two additional plates 11 and 12 removably attached to the respective sides of the main monolithic part of the instrumented pendulum 1.

Further, the present invention describes an automatic device 6 for releasing the pendulum at different values of firing angle and a Charpy impact machine comprising the instrumented pendulum 1 and the automatic device 6.

BRIEF DESCRIPTION OF FIGURES

In order to complement the present description and obtain a better understanding of the features of the present invention, and in accordance with a preferred embodiment thereof, a set of figures is presented, in an exemplified but not limiting manner.

DETAILED DESCRIPTION

An instrumented pendulum 1, according to a preferred embodiment of the present invention, is described in detail, based on the attached figures.

The instrumented pendulum 1 of the present application, used in a Charpy impact machine, is able to provide the absorbed energy, the impact force during fracture, and to determine the ductile-brittle transition temperature of miniaturized samples, preferably of metallic material, complying with standards ASTM E2248-18, BS EN ISO 148-1: 2016 and ISO 14556:2015.

The instrumented pendulum 1 of the present application allows adopting a wide range of values of impact energy and, consequently, has the flexibility to perform tests on a plurality of miniaturized test specimens by means of a pendulum of variable mass. Further, the present invention also allows the use of different values of firing angle of the instrumented pendulum 1, allowing the performance of tests of miniaturized specimens, which require much lower levels of potential energy than samples tested on a conventional scale.

Figures 1, 2:
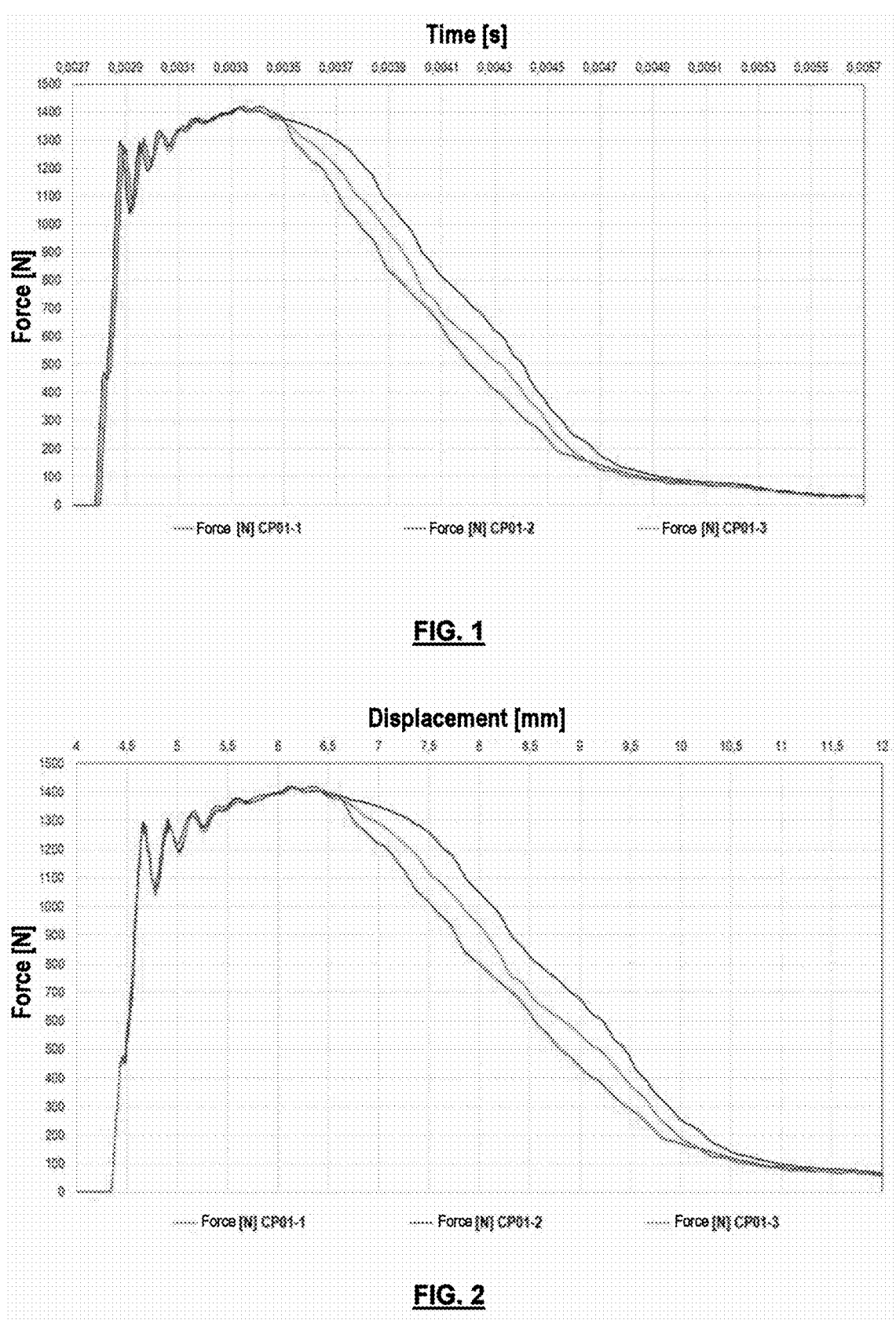
FIG. 1 illustrates an example graph of Force versus Time, obtained with the instrumented pendulum of the present invention.
FIG. 2 illustrates an example graph of Force versus Displacement, obtained with the instrumented pendulum of the present invention.

The instrumented pendulum 1 of the present application allows obtaining results in terms of Absorbed Energy (Ks) in joules and the elaboration of graphs Force (N) versus Time (s) and Force (N) versus Displacement (mm), as illustrated in FIGS. 1 and 2.

The example graphs illustrated in FIGS. 1 and 2, following the guidelines of the standard ISO 14556:2015, allow the calculation of the Absorbed Energy (Ks) as the integral under the curve (in addition to that obtained by the difference in the potential energy of the pendulum), the ductile-brittle transition temperature, the maximum impact force (FN), the transition point from elastic to plastic deformation (Fy), and the Dynamic Fracture Toughness (KID).

In addition to these data, the present invention also has the advantage of allowing the investigation of impact energy along the thickness of mechanical components, such as, for example, in piping and welded joints; in this case, it allows to obtain results in the Heat Affected Zone (ZAC) and in the weld metal (MS), since the specimen has reduced dimensions (miniaturized).

Figure 3:
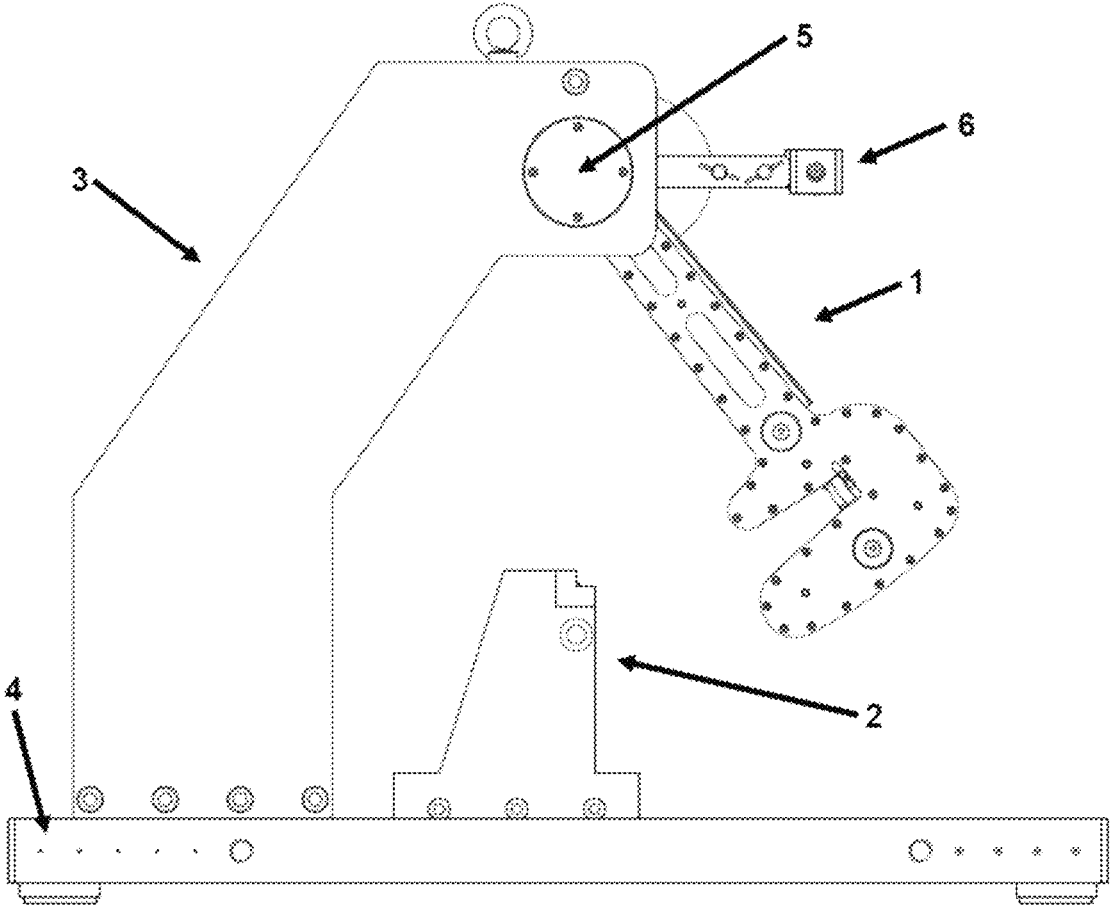
FIG. 3 illustrates a schematic representation of the Charpy impact machine with the instrumented pendulum of the present invention.

With reference to FIG. 3, there is a schematic illustration of a Charpy impact machine, which preferably comprises an instrumented pendulum 1, a sample holder 2, a support 3 for attaching the pendulum, a base 4, a device electromechanical 5. Optionally, the Charpy impact machine further comprises an automatic device 6 for releasing the pendulum.

Although a schematic form of a Charpy impact machine is illustrated in this invention, a technician skilled on the subject will appreciate that this is not the only form of Charpy impact machine to which the instrumented pendulum 1 of the present invention would be applicable. It would be apparent that it is possible for the instrumented pendulum 1 of the present invention to be capable of being applied to a plurality of compatible Charpy impact machines, of varied sizes, configurations, arrangements and for a plurality of different material tests.

Figure 5:
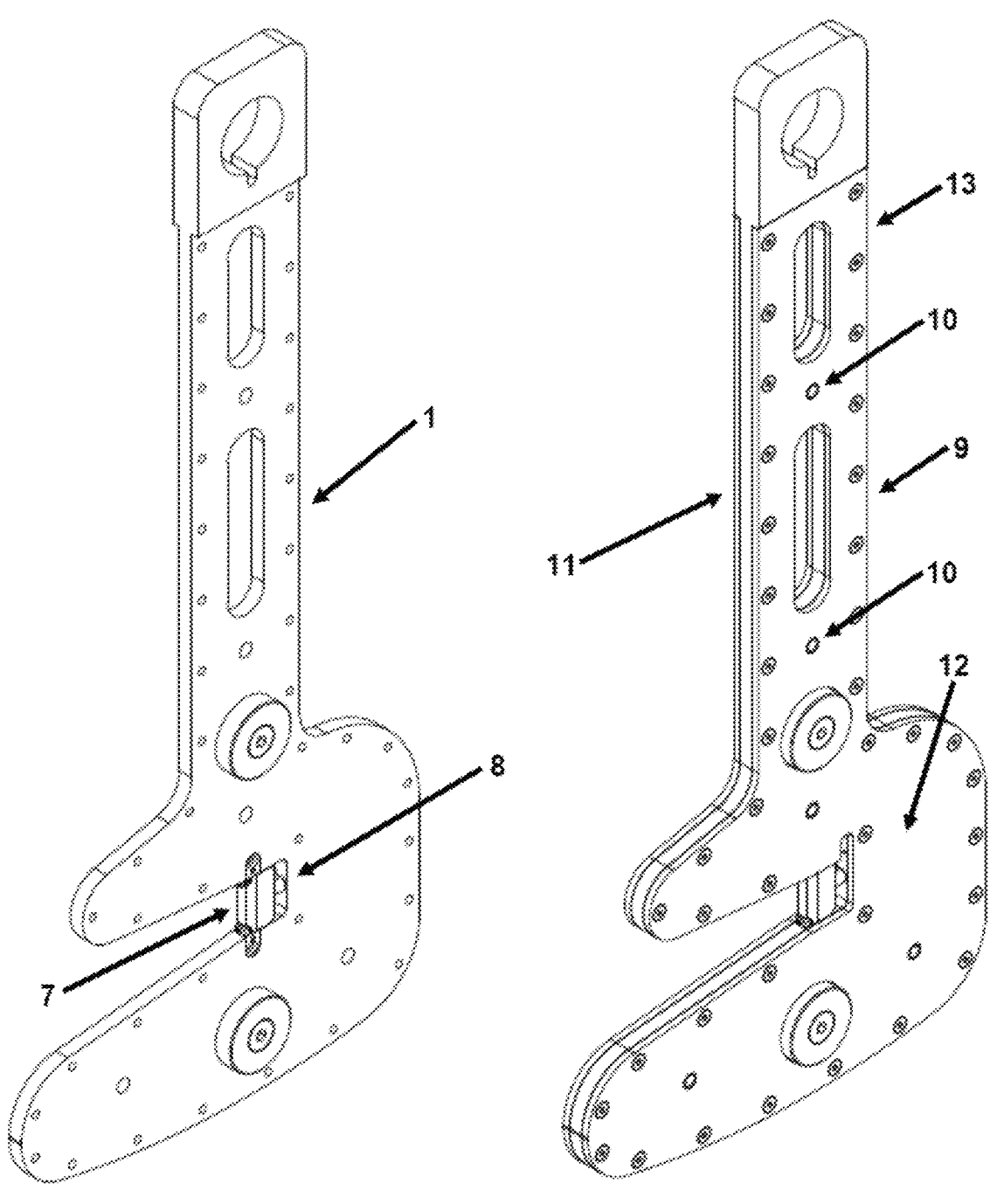
FIGS. 5a and 5b illustrate, respectively, the instrumented pendulum of the present invention without additional masses and with additional masses.

The instrumented pendulum 1, as shown in FIG. 5a, consists of a monolithic part and a cleaver 7. The monolithic part of the instrumented pendulum 1 can be manufactured from any component among metals, metal alloys or composites. It is preferably fabricated from substantially parallel-faced flat sheets of one material, or a combination of these materials.

The cutting of the pendulum monolithic part is preferably carried out by means of a wire electrical discharge machining process or by other known cutting processes, such as laser cutting, waterjet cutting, machining, etc.

It will be appreciated that the thickness and dimensions of the monolithic part of the instrumented pendulum 1 may vary according to the energy requirement of impact tests on miniaturized specimens of different dimensioning ranges, materials or applications.

Figure 4:
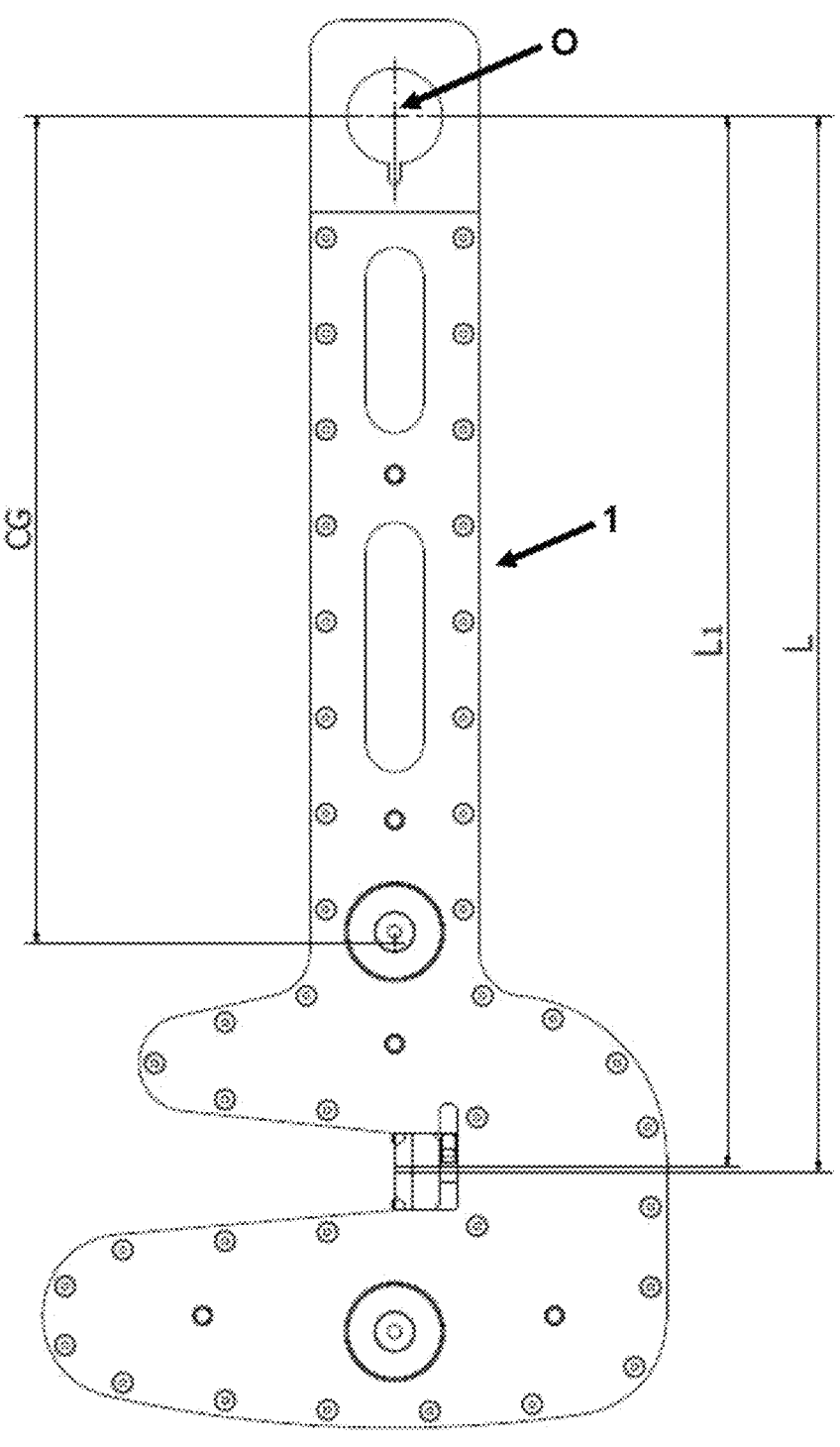
FIG. 4 illustrates a front view of the instrumented pendulum of the present invention, indicating the notable mechanical positions of its elements.

The instrumented pendulum 1 has a shape that generally resembles that of a hammer (front and rear view), as illustrated in FIG. 4. From the monolithic part of the instrumented pendulum 1, one can distinguish a body section and a head section. The monolithic part of the instrumented pendulum has a substantially uniform thickness.

The body section may comprise a plurality of slots or recesses. Preferably, the body section of the monolithic part comprises two vertical elongated slots arranged centrally therein. The slots, by reducing the mass in the body section, allow the mass of the instrumented pendulum 1 to be concentrated in its head section, thus resulting in a better use of the energy generated by the fall of the instrumented pendulum 1 to generate the impact force for the test.

The head section of the instrumented pendulum 1 has a generally "C" shape and houses a cleaver 7 in an anterior opening thereof, as shown in FIGS. 5a and 5b. The opening of the instrumented pendulum 1 is opposite to a rear portion 9 of the instrumented pendulum 1. The cleaver 7 is the element responsible for the collision with the miniaturized specimen, which is equipped with a force sensor 8 mounted in its posterior region, in the position of center of impact L of instrumented pendulum 1.

The force sensor 8 is preferably a piezoelectric-type load cell.

Figure 8:
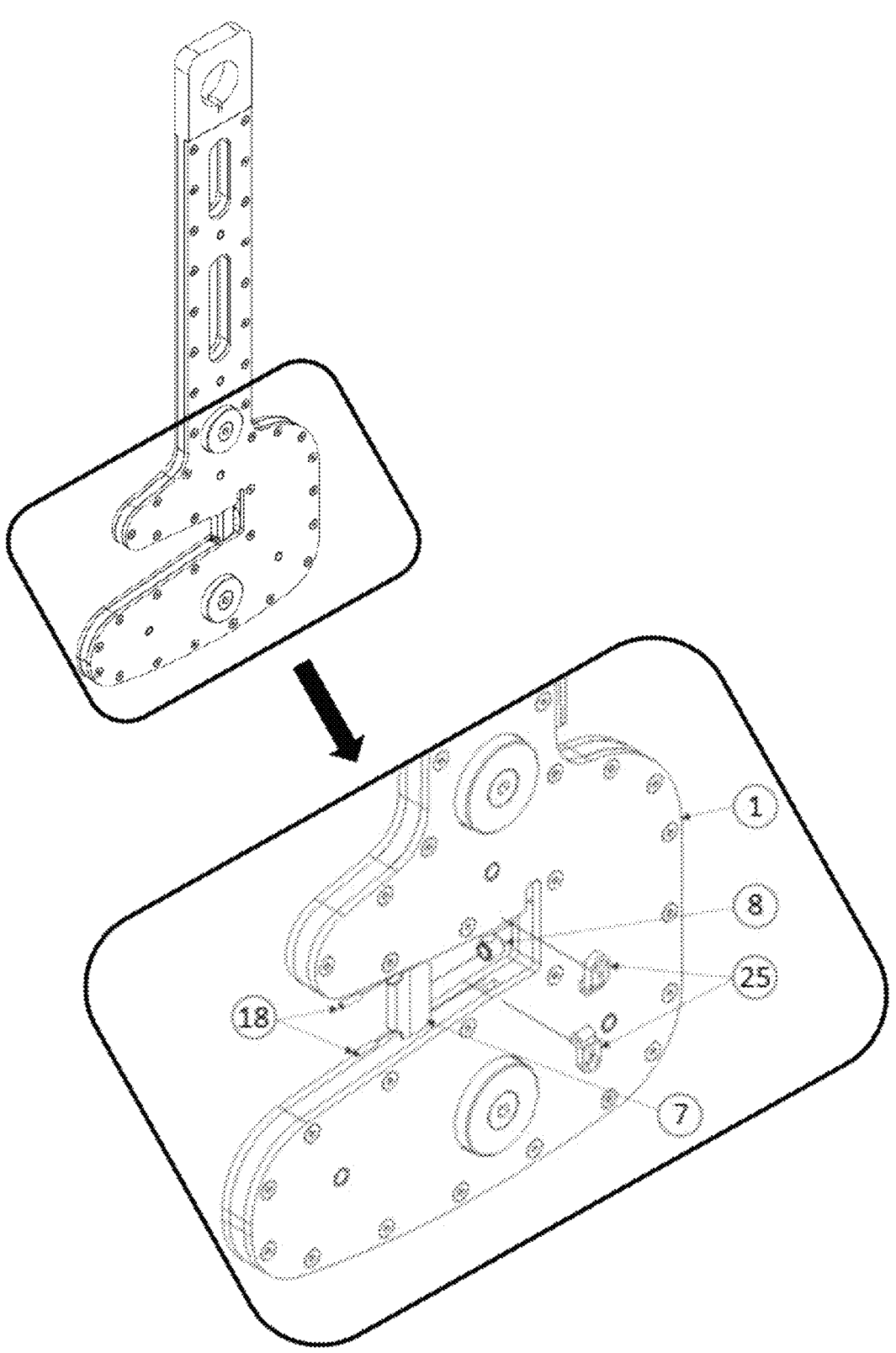
FIG. 8 illustrates an enlarged view of a head section of the instrumented pendulum and the details of housing a cleaver in the same.

As illustrated in FIGS. 5a, 5b and 8, the force sensor 8 is mounted in the posterior region of the cleaver 7, in such a way that one of the faces of the force sensor 8 has an interface with the instrumented pendulum 1 and the other interface with cleaver 7.

Figure 6:
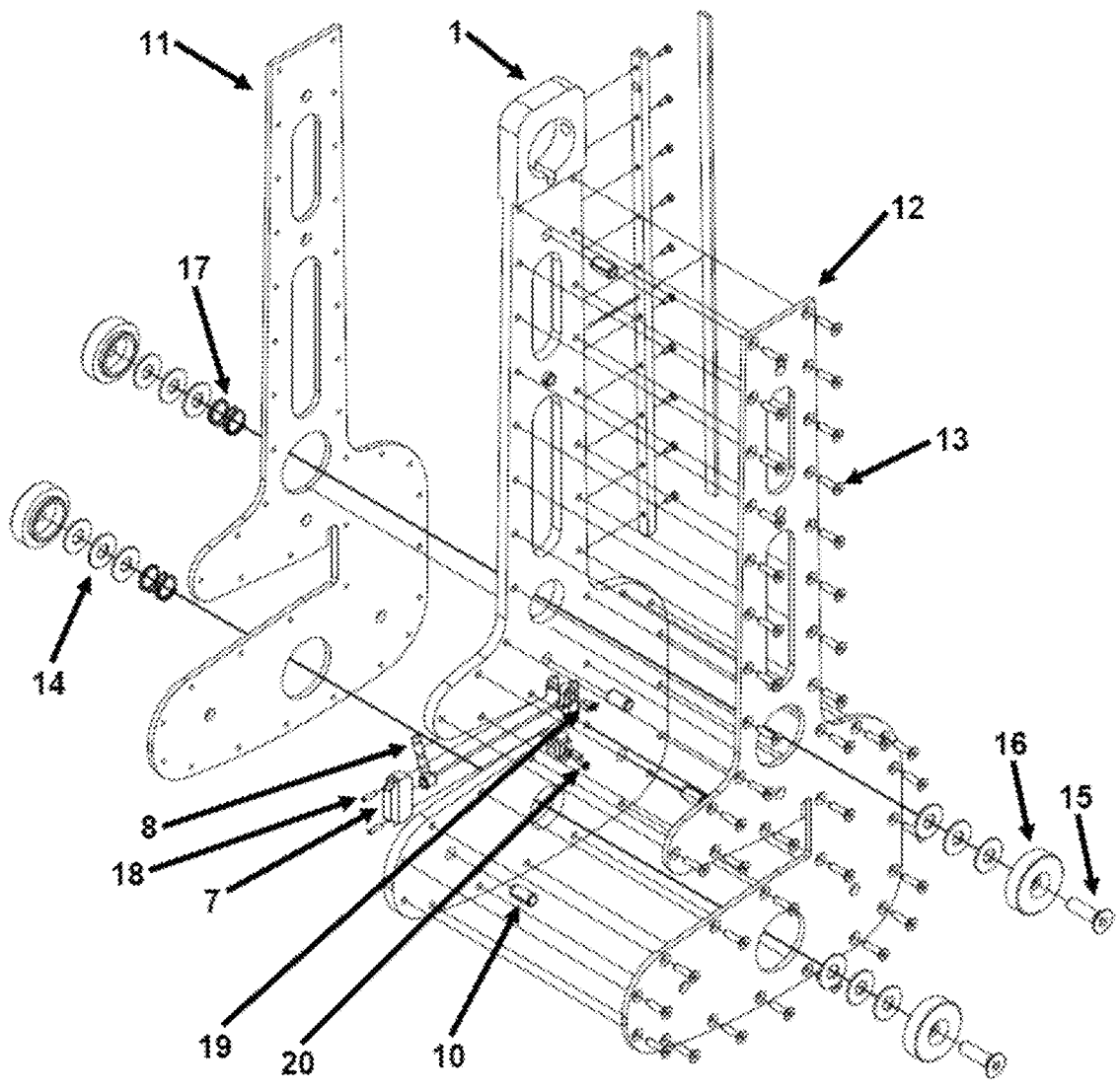
FIG. 6 illustrates an exploded view of the instrumented pendulum of the present invention with additional masses.
Figure 10:
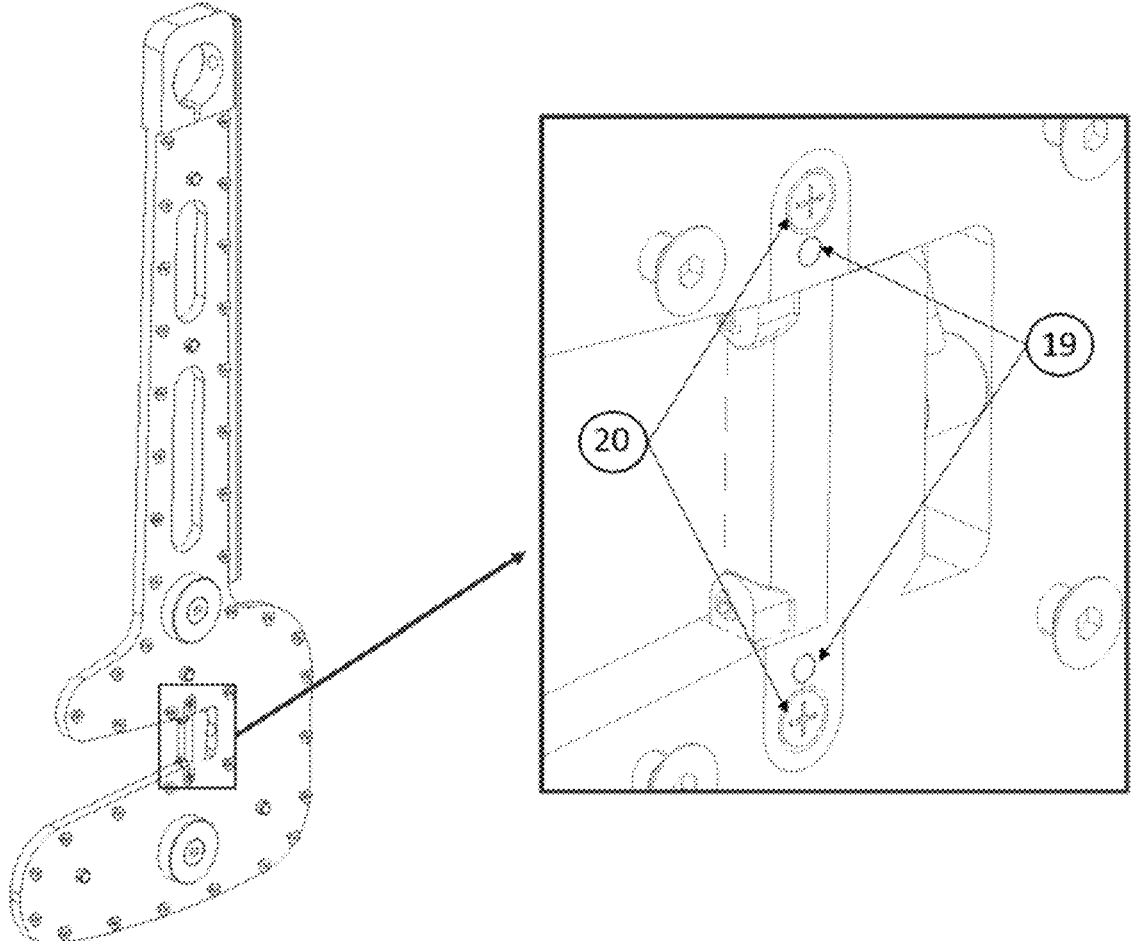
FIG. 10 illustrates enlarged views of the guide pin elements 19 and screw 20.

As further illustrated in FIG. 6 and FIG. 8, the cleaver 7 is slidably housed in the instrumented pendulum 1 by means of fasteners 25. The fasteners 25 are attached to the monolithic part of the instrumented pendulum by means of at least one guide pin 19 and screw 20 (FIG. 10). The cleaver 7 can be aligned and mounted on the fasteners 25 by means of at least one screw 18, preferably tightened with a preload that compresses the cleaver 7 against the force sensor 8 on an inner surface of the instrumented pendulum 1.

The fasteners 25 preferably comprise, respectively, a sliding guide feature that, during the impact with the specimen, enables the transmission of the impact force from the cleaver to the force sensor 8.

The piezoelectric-type load cell, when temporarily deformed by impact with a sample during a test, sends electrical signals to a data acquisition system, which interprets the electrical signals as a force value. These force values can be cross-referenced with instrumented pendulum 1 angle data from the precision encoder and/or other data obtained and/or inputted by a user to enable obtaining relevant information about the sample.

Sending electrical signals from the force sensor 8 to a data acquisition system can be performed through a data transmission medium. The data transmission medium can be a data wire or a wireless transmitter. In case the data transmission medium is a data wire, the instrumented pendulum can optionally comprise a component that houses and protects the data wire, thus preventing it from moving during movement and impact with the specimen.

The instrumented pendulum 1, as shown in FIG. 4, is designed in such a way that its center of percussion L1 is coincident with the center of impact L. In this way, reactive shocks are minimized in the geometric axis of rotation O of the instrumented pendulum 1, resulting from the impact of the cleaver 7 with miniaturized specimens, during the tests.

As illustrated in FIGS. 5a and 5b, the instrumented pendulum 1 has two configurations. The first configuration consists of a single monolithic part; that is, the instrumented pendulum 1 itself. In the second configuration, the at least two additional plates 11 and 12, shaped substantially corresponding to the shape of the instrumented pendulum 1, are removably attached to the respective sides of the instrumented pendulum 1.

The additional plates 11 and 12 are attached to the instrumented pendulum 1 preferably by means of recessed screws 13. The respective additional plates 11 and 12 must be used simultaneously on each of the respective sides of the instrumented pendulum 1, in order to avoid the assembly imbalance.

Although two additional plates 11 and 12 are illustrated in the preferred embodiment of the invention, it will be apparent that a plurality of additional plates of varying thicknesses and/or different materials can be arranged in a stacked configuration on each of the respective sides of the instrumented pendulum 1. That is, depending on the energy requirements for carrying out a test on a given specimen, plates of different thicknesses and/or different materials can be stacked to allow a more precise adjustment of the additional mass to be incorporated into the pendulum.

The additional plates 11 and 12 preferably comprise slots or recesses complementary to those present in the instrumented pendulum 1.

The attachment of additional plates 11 and 12 to the instrumented pendulum 1 provides the possibility of considerably expanding the range of impact energy (KN) available for testing miniaturized specimens. Furthermore, the attachment of additional plates 11 and 12 allows varying the energy applicable to the miniaturized sample by the instrumented pendulum 1 without changing the length thereof.

The additional plates 11 and 12 can be manufactured from any of metals, metal alloys or composites. They are preferably made from substantially flat sheets of one material or a combination of these materials. The thickness of the additional plates 11 and 12 is preferably between about 1 mm and 4 mm. The cutting of the additional plates 11 and 12 is preferably carried out by means of a wire electrical discharge machining process, or by other known cutting processes, such as laser cutting, water jet cutting, machining, etc.

The total mass of the complete instrumented pendulum 1 is the result of the sum of its mass and the mass of the additional plates 11 and 12, which total mass can be varied according to the energy demand required by the specimen material to be tested. In this sense, the mass of the pendulum with the additional plates 11 and 12, when compared with only the mass of the main instrumented pendulum 1, can be varied by up to 300%, preferably varied by up to 200%, and most preferably varied by up to 100%.

The attachment of additional plates 11 and 12 to the instrumented pendulum 1 can also be assisted by centering pins 10. The centering pins 10 are attached in complementary holes contained in the structure of the instrumented pendulum 1 and in the additional plates 11 and 12. The centering pins 10 have the function of facilitating alignment when attaching the additional plates 11 and 12 to the instrumented pendulum 1. It will be appreciated that the number of centering pins 10 may vary according to the dimensioning of the instrumented pendulum 1 and, consequently, of the additional plates. Preferably, at least two centering pins 10 are used.

The present invention preferably has an electromechanical device 5 that measures the rotational movement of the support shaft 22 that contains the instrumented pendulum 1. More specifically, the electromechanical device 5 is preferably a precision rotary encoder to measure an instantaneous angle of the angular position, around a geometric axis of rotation O, of a support shaft 22 coupled to the instrumented pendulum 1.

Figure 7:
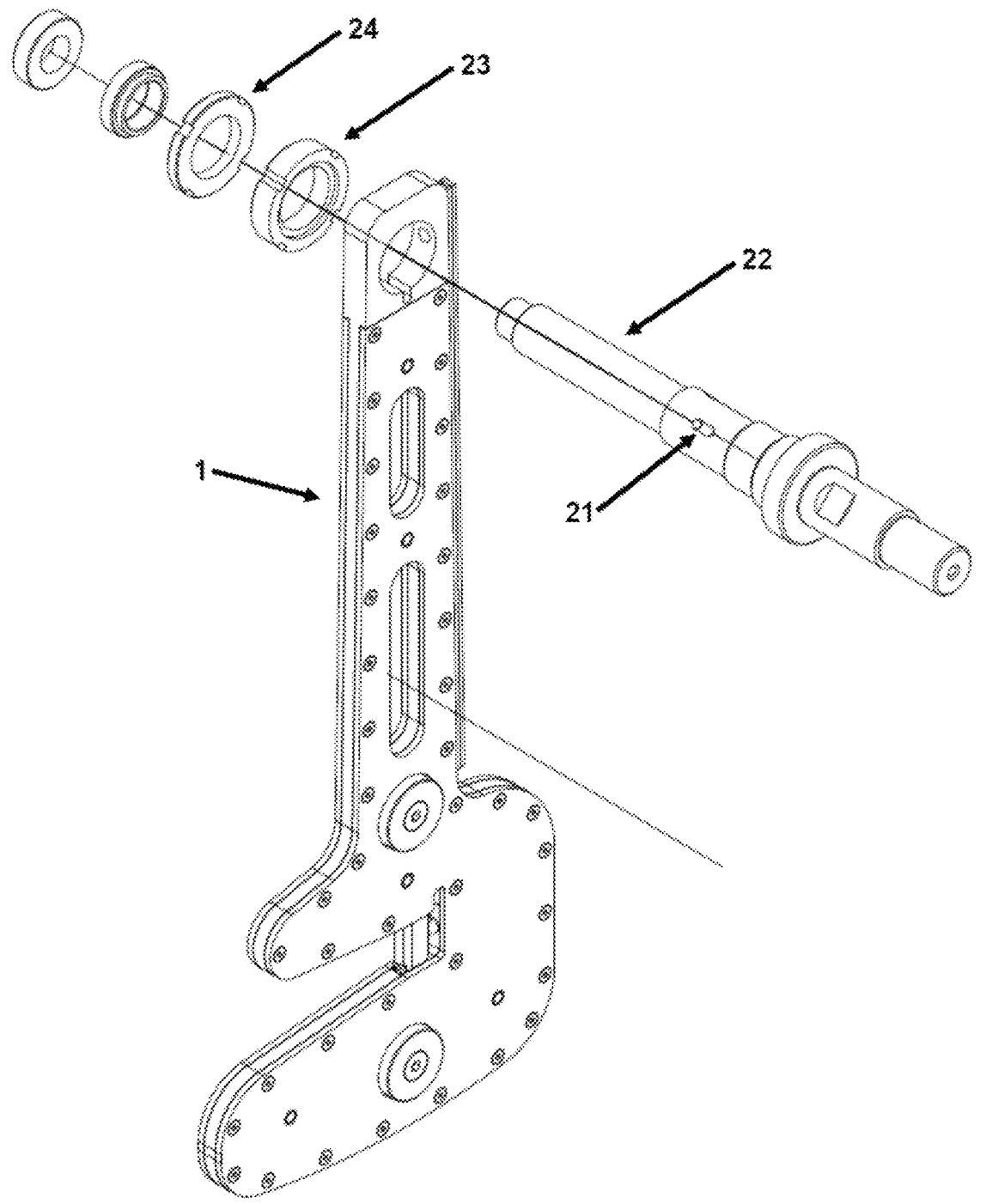
FIG. 7 illustrates an exploded view of the instrumented pendulum attachment system on a support shaft.

As illustrated in FIG. 7, the instrumented pendulum 1 is mounted with a sliding interference on a support shaft 22, which in turn is mounted on the support 3 of the Charpy impact machine. The support shaft 22 comprises a transverse pin 21 which fits into a slot in an upper hole in the body section of the instrumented pendulum 1 and ensures the transfer of motion from the instrumented pendulum 1 to the support shaft 22. The transverse pin 21 is supported by a compression nut 23.

A locknut 24 is used for the final assembly of the instrumented pendulum 1 to the support shaft 22, which applies a longitudinal load to the shaft, thus ensuring an assembly without the presence of gaps between that of the instrumented pendulum 1 and the shaft support 22. Additionally, the locknut 24 prevents the loosening of the compression nut 23.

An area around the upper hole of the body section can optionally be thicker than the rest of the monolithic part of the instrumented pendulum 1. The optional thickness of the area around the upper hole can be such that, when the additional plates 11 and 12 are attached to the instrumented pendulum 1, the thickness of the assembly (pendulum plus additional plates) is substantially equal to the thickness of the area around the upper hole of the body section of the instrumented pendulum 1. Such an arrangement results in substantially smooth side surfaces of the assembly of instrumented pendulum 1 and additional plates 11 and 12. It will be appreciated that substantially smooth side surfaces, either with or without additional plates 11 and 12, are advantageous as they minimize energy losses due to air drag force.

The instrumented pendulum 1 and the additional plates 11 and 12 may further comprise at least one complementary opening for hollow supports 16 that are configured to contain mass compensating rings 14. The mass compensating rings 14, generally at least two, are of optional use and provide an additional and finer degree of adjustment of the energy of impact on the sample when compared with the additional plates 11 and 12. Thus, with the use of the mass compensating rings 14, the total mass of the instrumented pendulum 1, in configuration with or without the at least two additional plates 11 and 12, respectively, it can be varied in a range of about up to 15%.

The complementary openings for the hollow supports 16 are preferably positioned aligned with respect to the geometric axis of rotation O of the pendulum.

The mass compensating rings 14 are generally circular in shape with a through hole in the middle. The mass compensating rings 14 can be made of different materials, thicknesses and dimensions, as long as they are suitable for the dimensions of the hollow supports 16 which, in turn, are suitable for the dimensions of the complementary openings.

It will be appreciated that, depending on the material used to manufacture the mass compensator rings 14, their weight varies accordingly. The mass compensating rings 14 can be manufactured from at least one of metals, metal alloys or composites.

The mass compensating rings 14 are contained within the hollow supports 16. The hollow supports 16 consist of two halves, joined by means of a screw 15 or equivalent means. The hollow supports 16 further comprise a preload spring 17, used to apply a compression load to the mass compensator rings 14 thus ensuring an assembly without the presence of gaps between the respective mass compensator rings 14, hollow supports 16 and the instrumented pendulum 1.

When using the mass compensating rings 14 in a test, they should preferably be used in equal numbers in each of the halves of the hollow supports 16, in order to avoid unbalancing the assembly.

Depending on the specimen to be tested by the instrumented pendulum 1, it will be appreciated that it can have a configuration without hollow supports 16 or, optionally, a configuration in which the hollow supports 16 are free of mass compensating rings 14.

Figure 9:
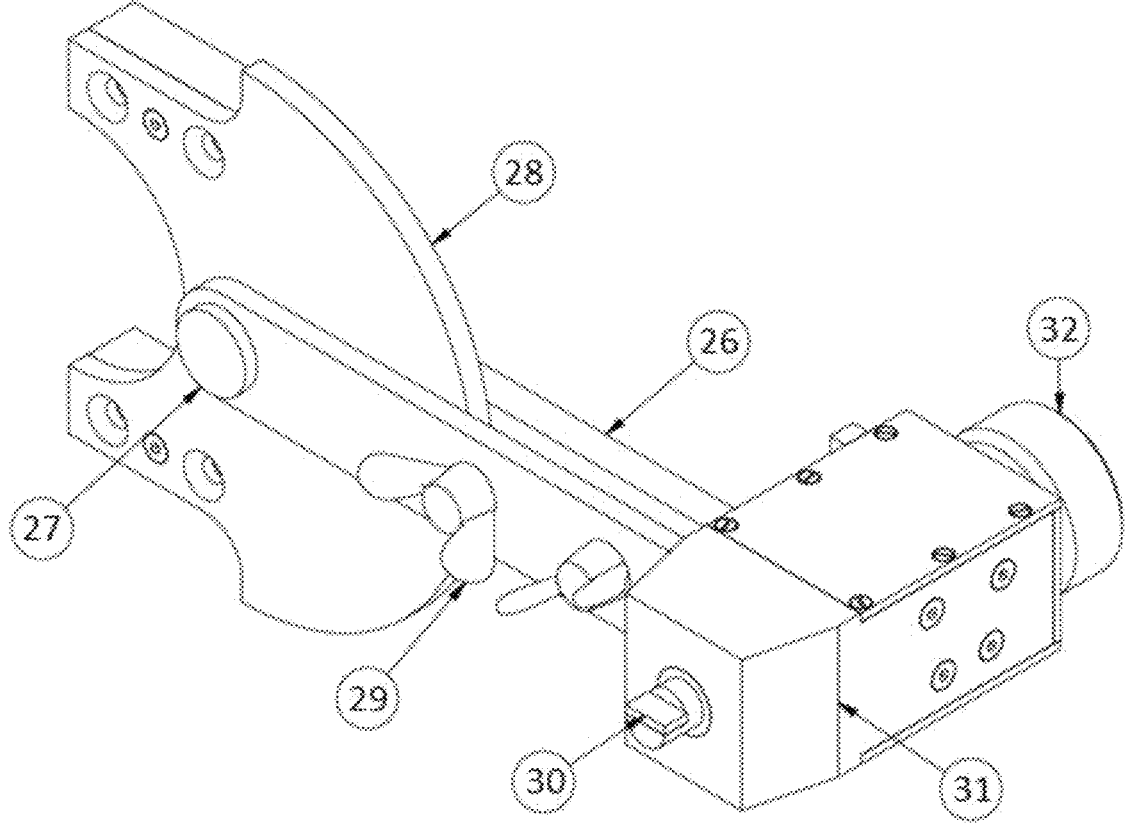
FIG. 9 illustrates a perspective view of an automatic device for releasing the instrumented pendulum.

The present invention optionally also has an automatic device 6 for releasing the pendulum, as shown in FIG. 9. The automatic device 6 for releasing the pendulum can be used in order to complementarily provide an additional degree of impact energy variation of instrumented pendulum 1.

The automatic device 6 for releasing the pendulum is attached by means of screws, rivets, welding, or equivalent means to the support for attaching the pendulum 3, preferably close to the support shaft 22.

The automatic device 6 for releasing the pendulum consists of a yoke 26, shaft 27, adjustment disc 28, at least one clamping means 29, a pin 30, a solenoid 31, and a handle 32.

The yoke 26 consists of two bars that can rotate around the shaft 27 that is arranged in the adjustment disc 28. The adjustment disc 28 is preferably an adjustment disc made of steel. The bars of the yoke 26 can be pressed/compressed in the direction of lowest moment of inertia against the adjustment disc 28. The compression load is obtained through the clamping means 29, which can preferably be a butterfly screw, which causes a compressive force on the yoke bars against the adjustment disc 28.

Thus, by friction, it is possible to lock the yoke 26 that contains the pin 30 at its end, suitable for supporting the instrumented pendulum 1 in different angular positions. For the automatic release of the instrumented pendulum 1, a solenoid 31 is used, which, when energized, retracts the pin 30, releasing the pendulum.

The positioning of the pendulum is preferably performed by a user/operator and the angle is precisely measured/adjusted through the electromechanical device 5, which measures the rotational movement of the shaft that contains the pendulum. For this, the handle 32 must be pulled to manually retract the pin 30. Then, the pendulum must be moved to the desired position/angle, in such a way that the structure of the instrumented pendulum 1 rests on the pin 30 and waits for the automatic release to perform a test.

Those skilled in the art will value the knowledge presented herein and will be able to reproduce the invention in the presented embodiments and in other variants, encompassed in the scope of the appended claims.

The invention claimed is:

1. An instrumented pendulum for a miniaturized Charpy impact test, wherein the instrumented pendulum comprises:
  a main monolithic portion comprising:
    a head section, wherein the head section is in a C-shape,
    a body section, and
    an upper hole;
  a cleaver housed in an anterior opening of the main monolithic portion;
  at least two plates, wherein one of the at least two plates is removably attached to each respective side of the main monolithic portion; and
  one or more hollow supports;
  wherein the main monolithic portion and the at least two plates each comprise one or more complementary openings to receive the one or more hollow supports, wherein the one or more complementary openings are aligned with respect to a geometric axis of rotation of the instrumented pendulum.

2. The instrumented pendulum of claim 1, wherein the at least two plates increase a total mass of the instrumented pendulum between 100% to 500%.

3. The instrumented pendulum of claim 1, wherein each of the at least two plates comprise a plurality of plates of varying thicknesses and/or materials configured to be arranged in a stacked configuration on the respective sides of the main monolithic portion.

4. The instrumented pendulum of claim 1, wherein the at least two plates have a shape that corresponds to a shape of the main monolithic portion.

5. The instrumented pendulum of claim 1, wherein the at least two plates are attached to the respective sides of the main monolithic portion by means of a plurality of recessed screws.

6. The instrumented pendulum of claim 1, wherein the main monolithic portion and the at least two plates each comprise at least two complementary holes for at least two centering pins.

7. The instrumented pendulum of claim 1, wherein the one or more hollow supports comprise two halves, joined together by a screw.

8. The instrumented pendulum of claim 1, wherein the one or more hollow supports each comprise at least two mass compensating rings and a preload spring.

9. The instrumented pendulum of claim 8, wherein the at least two mass compensating rings change a total mass of the instrumented pendulum, in a configuration with or without the at least two plates, by up to 30%.

10. The instrumented pendulum of claim 1, wherein the cleaver is equipped with a force sensor mounted at a posterior region of the cleaver, at a center of impact of the instrumented pendulum.

11. The instrumented pendulum of claim 10, wherein the force sensor is a piezoelectric-type load cell.

12. The instrumented pendulum of claim 1, wherein the cleaver is slidably attached to the anterior opening of the main monolithic portion by means of fasteners.

13. The instrumented pendulum of claim 1, further comprising a center of percussion which is coincident with a center of impact.

14. The instrumented pendulum of claim 1, wherein the head section and the body section of the main monolithic portion have a uniform thickness.

15. The instrumented pendulum of claim 1, wherein a thickness around the upper hole is greater than a thickness of the head section and the body section of the main monolithic portion.

16. A Charpy impact machine comprising:
  an instrumented pendulum comprising:
    a main monolithic portion;
    a cleaver, housed in an anterior opening of the main monolithic portion;
    at least two plates, at least one of the at least two plates removably attached to respective sides of the main monolithic portion; and
    one or more hollow supports;
    wherein the main monolithic portion and the at least two plates each comprise one or more complementary openings to receive the one or more hollow supports, wherein the one or more complementary openings are aligned with respect to a geometric axis of rotation of the instrumented pendulum;
  a support shaft coupled to the main monolithic portion and a support arm;
  a base connected to the support arm; a sample holder attached to the base; and
  an electromechanical device, positioned at the geometric axis of rotation of the instrumented pendulum.

* * * * *